Patented Aug. 19, 1941

2,253,116

UNITED STATES PATENT OFFICE 2,253,116

LAWN EDGER

James T. Findlay, Abilene, Kans.

Application August 5, 1940, Serial No. 351,490

1 Claim. (Cl. 97—227)

The invention aims to provide an exceptionally simple and inexpensive, yet an efficient and desirable tool for edging lawns and for successfully meeting any conditions which may be encountered, the tool being so constructed that it is simply necessary to pull same upon or under the surface of the ground without any chopping action, whether cutting weeds or tough grass, cutting other kinds of grass, or simply shaving, leveling, or terracing.

With the foregoing in view, the invention resides in the novel subject matter hereinafter described and claimed, description being accomplished by reference to the accompanying drawing.

Figure 1:
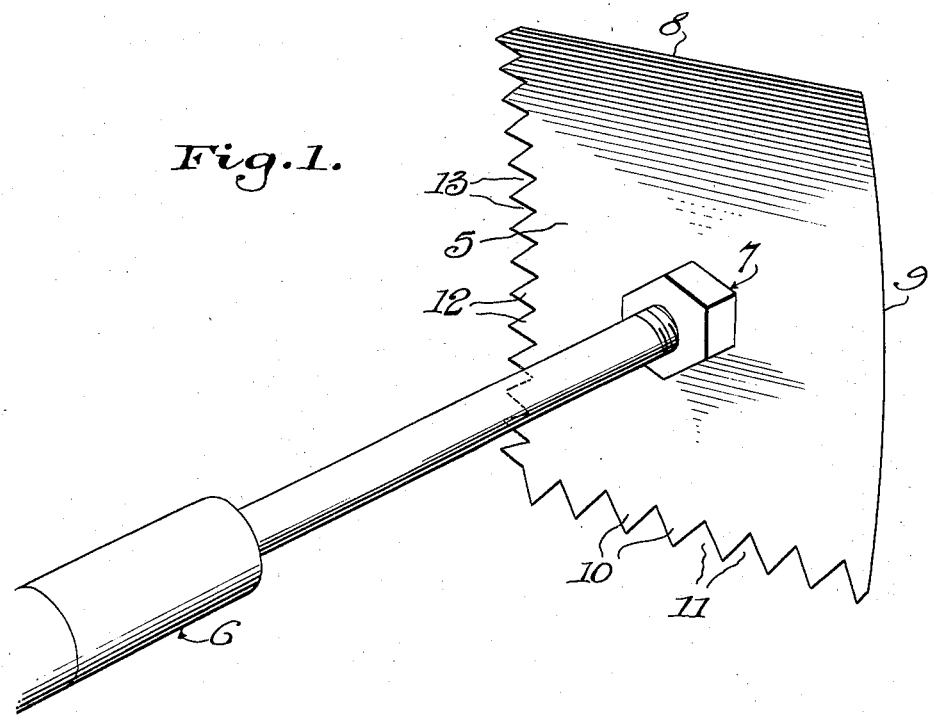
Figure 1 is a perspective view of the tool.
Figure 2:
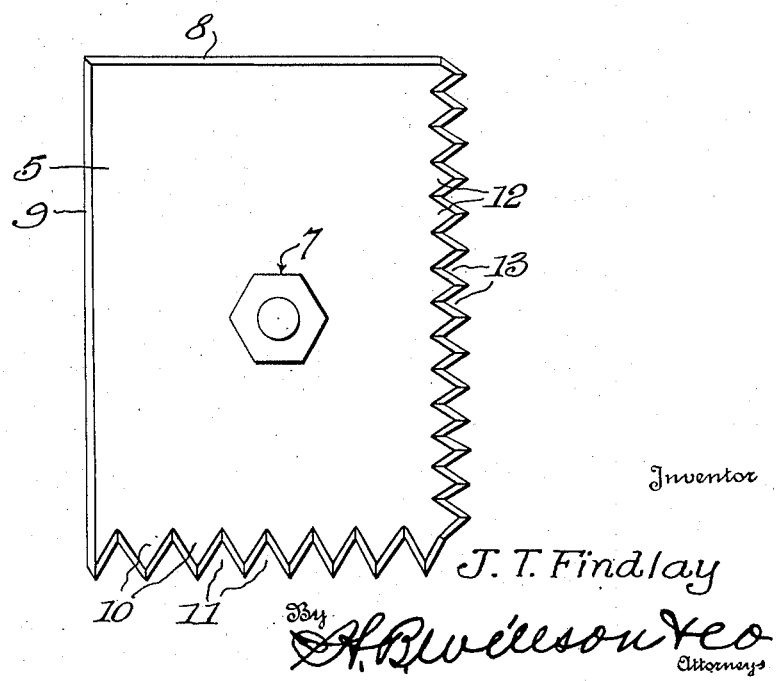
Figure 2 is a front elevation.

The construction herein disclosed has proven highly advantageous and successful in actual use and is preferably followed. However, it is to be understood that minor variations may be made in structure and that I am not restricted to proportions or sizes or to materials.

I provide a one-piece rectangular metal plate 5 preferably formed from steel, said plate being longitudinally curved and having its convex side disposed forwardly. The front extremity of a suitable handle 6 is suitably secured at 7 to the center of the plate 5, said handle being at right angles to a plane touching the four corners of the plate.

One end edge 8 and one longitudinal edge 9 of the plate 5 are straight and sharpened (by grinding or filing at the front side of the plate) to provide shearing edges for terracing, leveling and light cutting. The other end edge and the other longitudinal edge of the plate are each provided with a set of V-shaped cutting teeth, and with V-shaped notches between said teeth. The set of teeth and the intervening notches at the end of the plate are denoted at 10 and 11 respectively, and the corresponding teeth and notches at the longitudinal edge of the plate are illustrated at 12 and 13 respectively. All edges of both sets of teeth are sharpened (by grinding or filing at the front of the plate) to provide sharp cutting edges which are operable to cut grass, weeds and the like simply when the tool is pulled upon the ground. The teeth 10 are larger than the teeth 12 for cutting rather large weeds and tough grass, and said teeth 12 are used for medium and light cutting, grading and trimming. The two adjacent teeth 10 and 12 at one corner of the plate 5 jointly form a relatively wide tooth of fish-tail shape which may be used for cutting unusually large weeds.

The shearing edges 8 and 9 and the two sets of cutting teeth 10 and 12 will successfully meet all conditions which may be encountered in edging lawns, and to bring any edge of the plate into position for operation, it is simply necessary to turn the handle 6 to the proper extent. The tool is operated by simply pulling it along or slightly under the surface of the ground without any chopping action and in actual practice, it has been found to perform excellent work even under very unfavorable conditions. It will be noted that the tool can be used to cut level and bevel in one motion without lifting it from the ground, by simply slightly tipping the edger.

I claim:

A lawn edging tool comprising a one-piece rectangular plate, and a straight elongated handle having its front end secured to the center of said plate to permit any edge of the plate to be brought into contact with the ground by rotating said handle, said plate being longitudinally curved and transversely straight and having its concave side disposed rearwardly, one end edge and one longitudinal edge of said plate being plain and being beveled at the front of the plate to provide two plain sharp cutting edges meeting each other at a right angle, the other longitudinal edge of said plate being provided throughout its length with a set of sharply pointed straight-edged relatively small V-shaped teeth and sharply pointed V-shaped notches between and of the same size as said teeth, the other end edge of said plate being also provided throughout its length with a set of sharply pointed straight-edged relatively large V-shaped teeth and sharply pointed V-shaped notches between and of the same size as said relatively large teeth, the teeth of both of said sets being beveled at the front of the plate to provide them with sharp cutting edges, the two teeth at the adjacent ends of said two sets jointly forming a still larger tooth of fish-tail shape and having an obtuse angular cutting edge formed by the outer edges of said two teeth, all of the aforesaid cutting edges being operable by simply pulling the tool with no chopping action and no lateral movement.

JAMES T. FINDLAY.